Sept. 16, 1958     E. H. LAND     2,852,691
RADIATION DETECTION DEVICES

Original Filed Sept. 29, 1949     3 Sheets-Sheet 1

INVENTOR
Edwin H. Land
BY Brown and Mikulka
and
Moncure B. Berg
Attorneys

Sept. 16, 1958 E. H. LAND 2,852,691
RADIATION DETECTION DEVICES
Original Filed Sept. 29, 1949 3 Sheets-Sheet 2

INVENTOR
Edwin H. Land
BY Brown and Mikulka
and
Moncure B. Berg
Attorneys

Sept. 16, 1958 E. H. LAND 2,852,691
RADIATION DETECTION DEVICES
Original Filed Sept. 29, 1949 3 Sheets-Sheet 3

INVENTOR
Edwin H. Land
BY Brown and Mikulka
and
Moncure B. Berg
Attorneys

United States Patent Office 2,852,691
Patented Sept. 16, 1958

2,852,691

RADIATION DETECTION DEVICES

Edwin H. Land, Cambridge, Mass., assignor to Polaroid Corporation, Cambridge, Mass., a corporation of Delaware Original application September 29, 1949, Serial No. 118,596, now Patent No. 2,687,478, dated August 24, 1954. Divided and this application July 19, 1954, Serial No. 444,151

18 Claims. (Cl. 250—65)

This invention relates to radiation-sensitive products, and more particularly to composite radiation-sensitive units of the type comprising a radiation-sensitive element and the reagents, including all of the liquid, required for processing said element to provide a visible indication of the extent to which said element has been exposed to radiation actinic thereto.

This application is a division of my copending application Serial No. 118,596, filed September 29, 1949, for Radiation Detection Devices, Patent No. 2,687,478.

One object of the present invention is to provide an improved unit of the foregoing type for detecting and for giving, when processed, a visible indication of the extent of the presence of nuclear radiation, i. e., of radiation such as is associated with X-rays, radium, uranium and other natural or artificial radioactive materials, and particularly gamma radiation, beta radiation and neutron radiation.

Another object of the invention is to provide a radiation-sensitive unit of a size and shape which adapts it to be readily borne by a person working in an environment which is apt to subject him to nuclear radiation, for giving a prompt indication, whenever desired, of the extent of exposure to said radiation.

Still another object of the invention is to provide a film unit comprising a radiation-sensitive layer and the reagents, including all of the liquid, required for processing said layer, which unit is capable of being processed without any special equipment in such a way that the photochemical reaction of the reagents on the radiation-sensitive element takes place at a temperature which is substantially independent of ambient temperatures.

A still further object is to provide a film unit of the foregoing type which can be safely and conveniently held and processed in the mouth of the user.

Still another object is the provision of a film unit comprising a radiation-sensitive element and a rupturable container carrying a liquid for processing said element, said container being so located in said unit with respect to said element as to be capable of releasing its contents in a plurality of directions to simultaneously process areas of said element located on opposite sides of said container.

A still further object of the invention is to provide a film unit adapted for detecting nuclear radiation, which unit can be promptly processed and which, when processed, will give an immediately recognizable indication of the degree of its exposure to said radiation.

Still another object is the provision of a self-contained film unit, including a radiation-sensitive element and the liquid for processing said element, which unit also includes as part of the structure thereof a flexible wall member which can be snapped from one position into another position and which, in its second position, releases the processing liquid from its container for processing the radiation-sensitive element and also insures the uniform distribution of the released liquid over said element.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
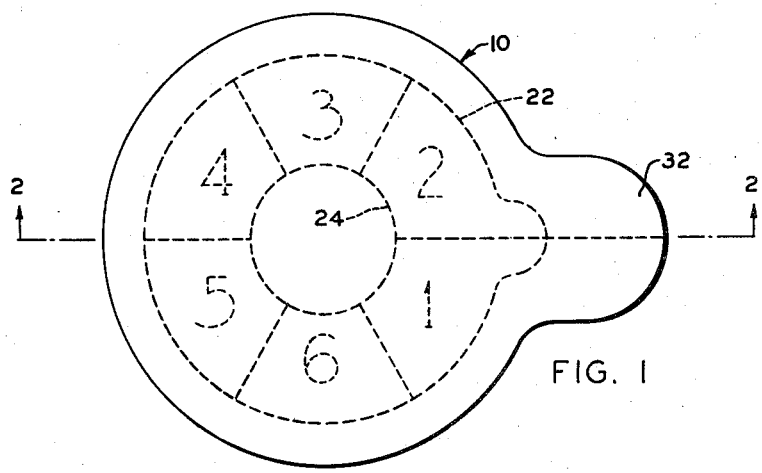
Figure 1 is a diagrammatic, exaggerated plan view of one embodiment of the invention.

In general, this invention relates to novel radiation-sensitive film units which can record the presence of radiation such as that associated with X-rays, radium, uranium or the like. More specifically, the present invention is adapted to detect radiation which can be characterized as nuclear radiation, i. e., radiation of the type which may be encountered in atomic warfare, including corpuscular and photon radiation, the latter being generally of a wave-length of 120 angstroms or less. The unit preferably comprises a first liquid-confining layer and a second liquid-confining layer, one of these liquid-confining layers preferably including a radiation-sensitive stratum, such as a silver halide emulsion. Because the radiation-sensitive stratum is usually sensitive not only to the radiation which it is desired to detect but also to the visible and near-visible radiation, it is preferable that the liquid-confining layers include strata which are opaque to that portion of the visible and near visible light, i. e., to light of a wave-length greater than 2,000 angstroms, which is actinic to the photosensitive material within the unit. At least one of these liquid-confining layers has a portion thereof which is at least partially transparent to the nuclear radiation whose presence is to be recorded or detected. Predetermined portions of the two liquid-confining layers are preferably sealed together so as to provide a liquid-confining envelope within the confines of which the radiation-sensitive stratum is positioned. Also positioned within this envelope is a rupturable container holding a sufficient quantity of a processing liquid for accomplishing a predetermined processing of the radiation-sensitive stratum after exposure thereof. The rupturable container is so positioned with respect to the radiation-sensitive stratum that, upon rupture of the container, the liquid released therefrom may be released to permeate the radiation-sensitive stratum to accomplish the processing thereof. In one preferred form of the invention the film unit embodying the invention is small and roughly circular. In this form the rupturable container is preferably positioned at the center of the badge and is arranged to discharge its contained liquid around substantially its whole circumference.

The term "photosensitive" as used hereinafter is to be expressly understood as being directed to a radiation-sensitive element which is sensitive to the radiation which it is desired to detect, as well as to part of the radiation within the visible and near visible spectrum.

In order to have a wider range of sensitivity and to obtain more easily an indication of the extent of a person's exposure to nuclear radiation, it is possible to employ in the film unit of the invention a photosensitive stratum whose sensitivity to the radiation to be detected varies from area to area. Thus, exposure of the photosensitive stratum to a given amount of radiation will produce a different effect on the various areas, rendering some more developable than others. It is also possible, where photosensitive nuclear radiations of longer wavelength, e. g., soft X-rays having low penetration characteristics, are to be detected, to construct the light-opaque stratum surrounding the radiation-sensitive element in such a way as to have its absorption for this radiation vary from area to area.

The actual processing reaction employed in such a film unit may be any of a number of different types. For example, it may comprise the development of exposed photosensitive material. It may involve a transfer process utilizing undeveloped photosensitive material. It may be the formation of a dye, the intensity of the dye formed being either a direct or inverse function of the degree of exposure. This dye may be formed in the photosensitive stratum or in a stratum adjacent thereto. Various processes for giving a visible indication of the extent to which a photosensitive emulsion has been exposed in a film unit of the type which comprises a photosensitive element and all of the materials, including the liquid, for processing that element, and suitable compositions for performing these processes, are shown and described in detail in my United States Patent No. 2,543,181, issued February 27, 1951, and these are applicable for indicating the extent of exposure of the radiation-sensitive stratum of the unit of the present invention.

Referring now to Figs. 1 through 4, there is shown one modification of the invention in the form of a film unit which may be mounted in a badge and is particularly adapted to detect the presence of nuclear radiation. The unit is capable of providing an immediately recognizable indication of the degree of exposure so that the user thereof may immediately ascertain whether or not he has been subjected to a dangerous amount of radiation. This arrangement is such that no complicated or time-consuming densitometric readings or apparatus are necessary. Another important feature of the invention of Figs. 1 through 4 involves the provision of a unit of the above type which can be inserted into the user's mouth so as to bring the temperature of the badge to a substantially uniform temperature, i. e., body temperature. This feature of the invention has the distinct advantage of giving extremely accurate controls of the processing reactions and is achieved by making the liquid-confining layers substantially completely impermeable to the processing liquid and to the liquids normally encountered in a human's mouth.

The waferlike film unit of Figs. 1 through 4 is shown as comprising a first liquid-confining layer 10 and a second liquid-confining layer 12. The liquid-confining layer 10 comprises a pair of strata 14 and 16, stratum 14 being an outer opaque stratum and stratum 16 being a liquid-impermeable stratum. Liquid-confining layer 10 also includes, as shown, an inner stratum 17 which is at least partially permeable to a processing liquid, this stratum preferably serving to carry certain of the processing reagents in position to be dissolved by the processing liquid. Stratum 17 may also serve as a background for a positive or negative image. The liquid-confining layer 12 comprises a pair of strata 18 and 20, the outer stratum 18 being preferably opaque and the inner stratum 20 being preferably liquid-impermeable. The liquid-confining layer 12 also carries, adjacent the stratum 20, a photosensitive stratum or layer 22, this layer 22 preferably comprising a silver halide emulsion mounted on a suitable base. Positioned between the two liquid-confining layers 10 and 12, and so arranged as to discharge its contained liquid between these two liquid-confining layers, there is provided a liquid-carrying container 24 having upper and lower walls 23 and 25, respectively. The container 24 releasably confines a predetermined quantity of a viscous processing liquid 26. Container 24 is preferably circular and has a liquid-releasing mouth 28 which is substantially coextensive with the circumference of the container, this liquid-releasing mouth 28 being formed by a rupturable seal between the edges of the upper and lower walls 23 and 25 of the container.

Figure 2:
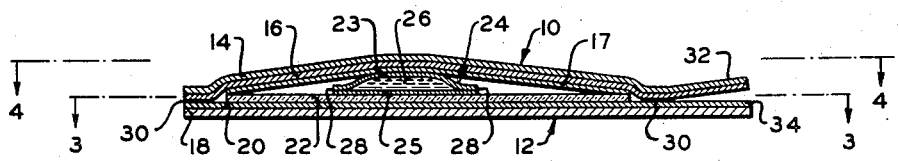
Fig. 2 is a diagrammatic exaggerated sectional view of Fig. 1 taken along the line 2—2.
Figure 3:
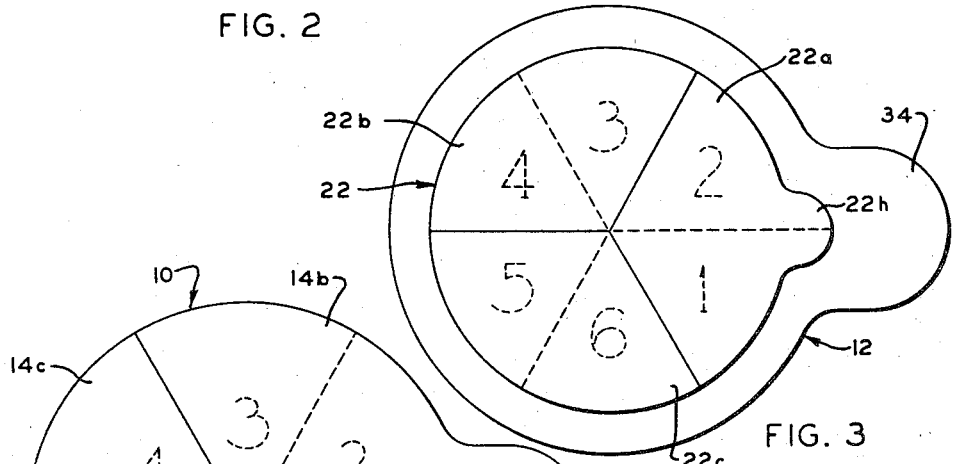
Fig. 3 is a diagrammatic exaggerated plan view of Fig. 2 taken along the line 3—3.

In a preferred form of the invention the liquid-confining layers 10 and 12 are sealed together at their edges, as indicated at 30 in Fig. 2, so as to provide a completely sealed envelope within which the container 24 and the radiation-sensitive silver halide layer 22 are positioned. For providing ease of separation of the two liquid-confining layers after processing the film unit, a pair of tabs 32 and 34 are provided as continuations of the liquid-confining layers 10 and 12, respectively.

In a satisfactory form of the unit, layer 14 comprises a paper-backed metal foil, for example a lead foil with a backing of kraft paper, and layer 16 is a coating of an alkali-inert plastic, such as polyvinyl butyral, on said foil. The liquid-confining layer 12 is also preferably formed of similar materials, the stratum 18 preferably including a paper-backed metal foil and the stratum 20 comprising a coating of a heat-sealable plastic, such as the above-mentioned polyvinyl butyral. With such an arrangement the two facing polyvinyl butyral surfaces are readily heat-sealed together during the manufacture of the unit to provide a liquid-tight seal 30 around the edges of the two superposed liquid-confining layers 10 and 12. While the preferred type of seal, i. e., a heat seal between the two impermeable coatings, has been described, other seals, such as pressure-sensitive adhesives or solvent-softened adhesives, may be employed.

The photosensitive layer 22, in one preferred embodiment (see Fig. 3), is formed of three segments, 22a, 22b and 22c, of radiation-sensitive materials of different sensitivity to the radiation to be detected, e. g., gamma radiation. Thus, segment 22a may be the most sensitive, while segment 22b is slightly less sensitive and segment 22c is the least sensitive. Segment 22a may be a medical X-ray film, segment 22b may be an industrial X-ray film and segment 22c can be a normal orthochromatic high contrast silver halide emulsion of the type commercially available for use in print making and wherein light, rather than X-rays, is utilized for creating a developable image. Other examples of suitable photosensitive materials are given in the "Proceedings of the I. R. E." (January 1949, pages 74–82). The arrangement is preferably such as to give indication of exposure as low as about 30 milliroentgens and as high as about 30,000 milliroentgens. For convenience of manufacture of these segments 22a, 22b, 22c, they are cut from suitable strips of the corresponding photosensitive film, each of the segments comprising the photosensitive emulsion and a suitable base therefor. These segments 22a, 22b and 22c are then preferably secured to the liquid-confining layer 12 by pressing these segments against the coating 20 in the presence of heat, the heat being preferably applied to the back side of the liquid-confining layer 12. Additionally, of course, it is equally possible to unite the various segments 22a, 22b and 22c to a suitable base prior to assembly with respect to the liquid-confining layer 12. In such a case the small tab 22h, associated with the segment 22a, is of assistance in obtaining proper registration of the various segments 22a, 22b and 22c with respect to the various tabs 32 and 34. A plurality of number "1," "2," "3," etc., are shown in dotted lines on each of the photosensitive segments. These numbers may represent portions which have been printed or otherwise coated on the photosensitive segments so that they possess a standard optical density.

The container 24 is also preferably formed of two paper-backed metal foil sheets, the upper sheet 23 comprising, for example, a paper-backed lead foil lined with polyvinyl butyral and the lower sheet 25 comprising, for example, a paper-backed lead foil lined with ethyl cellulose. These two sheets, after introduction of the predetermined quantity of the viscous processing liquid 26 therebetween, are heat-sealed together around the whole circumference thereof to give a substantially uniformly rupturable seal around the circumference, this seal being rupturable by increasing the hydraulic pressure of the liquid 26 carried by the container. The liquid 26 is preferably viscous and preferably includes a dispersion, preferably a solution, of a film-forming colloid, such as a film-forming plastic, protein or carbohydrate.

Figure 4:
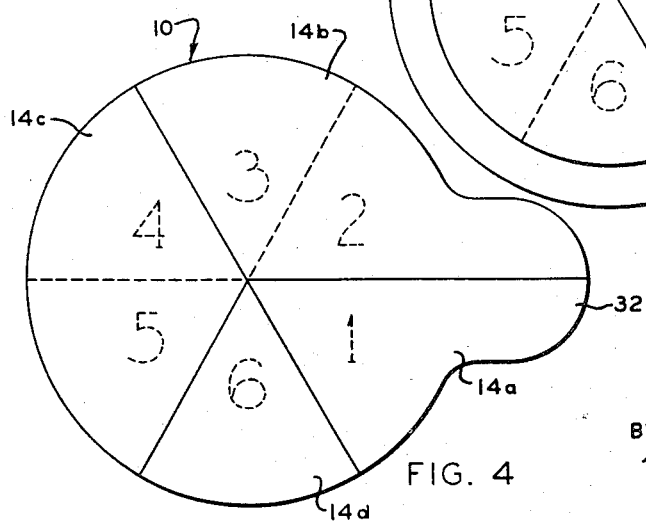
Fig. 4 is a diagrammatic exaggerated plan view of Fig. 2 taken along the line 4—4.

From an examination of Fig. 4 it can be seen that there is included a plurality of segments 14a, 14b, 14c and 14d on the liquid-confining layer 10, which segments bear a predetermined relationship to the segments 22a, 22b and 22c of the photosensitive layer 22. Liquid-confining layer 10 also preferably has indicia "1," "2," etc. corresponding to the indicia of photosensitive layer 22. In the form shown, the segment 14a represents a portion of the stratum 14 which has no metal film or other absorptive medium therein. As can be seen by a comparison of Figs. 3 and 4, section 14a overlies one half of the photosensitive segment 22a. This half of the segment 22a will thus be exposed by the smallest amount of incident radiation. The segment 14b represents a metal film, for example aluminum foil .5 mm. thick. This segment 14b overlies the second half of the segment 22a and one half of photosensitive segment 22b. Since segment 22a is more sensitive to the incident radiation than is segment 22b the former will be exposed to a given degree by less radiation than will the latter segment. Segment 14c may comprise a film of aluminum 1.0 mm. thick. Segment 14c overlies the second half of photosensitive segment 22b and one half of photosensitive segment 22c. In view of the difference in sensitivity between these latter two photosensitive segments, the two photosensitive segments underlying segment 14c will be made equally developable by different degrees of exposure to incident radiation. Segment 14d, which overlies the second half of photosensitive segment 22c, may comprise, for example, a film of aluminum 1.5 mm. thick. Thus, the photosensitive segment 22c underlying the segment 14d becomes developable only by the largest amount of radiation. It should be apparent from the above discussion that numerous modifications of the relationship between the various photosensitive portions and the overlying absorptive strata may be practiced. For example, more or less photosensitive segments may be employed and a greater or fewer number of segments of different absorption with respect to incident radiation may be employed. Of course, barriers having areas which are differently absorptive of the radiation are primarily useful in connection with radiation having low penetration characteristics.

In the use of the badge in Figs. 1 through 4, for detecting radiation of low penetrability, it is suitably secured to a portion of the wearer's clothing or body so that stratum 14 is outermost and the incident radiation passes through said stratum. Where the unit is to be used in the presence of gamma rays, the different thicknesses of portions of stratum 14 have only a negligible absorptive effect. At any time that the user of the badge wishes to ascertain the degree of exposure to radiation he can remove the badge for the purpose of processing it. If the temperature is low, for example in the neighborhood of 32° F., the badge may be placed in the wearer's mouth for a minute or two in order to raise the temperature thereof to approximately body temperature. The badge is then taken from the mouth and the liquid 26 is released from the container 24 by applying pressure to the centrally located container, thereby increasing the hydraulic pressure within the liquid until the confined liquid ruptures the circumferential seal of the mouth 28 to allow the liquid to be distributed radially from the container 24. The liquid 26 is thus forced out of the container 24 and covers all of the photosensitive segments 22 outside of the area covered by the container 24. The uniform distribution of the liquid may be assured, after release thereof, by placing the waferlike badge in the mouth and pressing with the tongue against the roof of the mouth. Equally, the user can place the badge between a pair of rigid discs and squeeze these discs together with his fingers. In many types of processes, for which this badge is suitable, an even distribution of the liquid is relatively unimportant, it only being necessary to assure a sufficient distribution of the liquid to cover the various portions of the photosensitive layer 22. In other cases, particularly those involving transfer processes, a layer of liquid of relatively uniform thickness throughout the various portions of the badge is preferred in obtaining accurate results.

From the above description of the use of the invention, it can be seen that the two liquid-impermeable strata 16 and 20 serve to both isolate the processing liquid 26 from the user's mouth and also to isolate liquids in the user's mouth from the processing liquid 26.

At the end of the processing time, which may vary from a few seconds to a minute or so, depending upon the particular process involved, the two tabs 32 and 34 are grasped and pulled apart so that the user can interpret the indicated degree of exposure as shown by the resultant processing.

Figure 5:
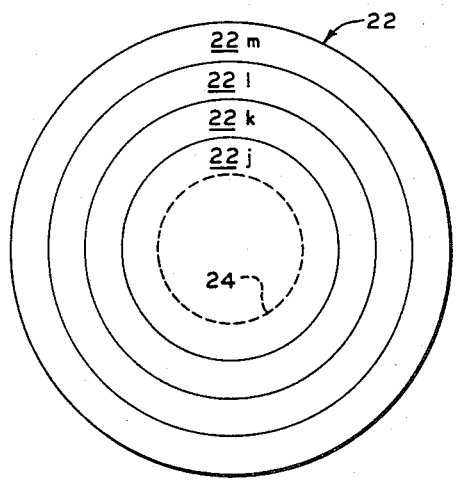
Fig. 5 is a diagrammatic exaggerated plan view of another modification of the radaition-sensitive layer.
Figure 6:
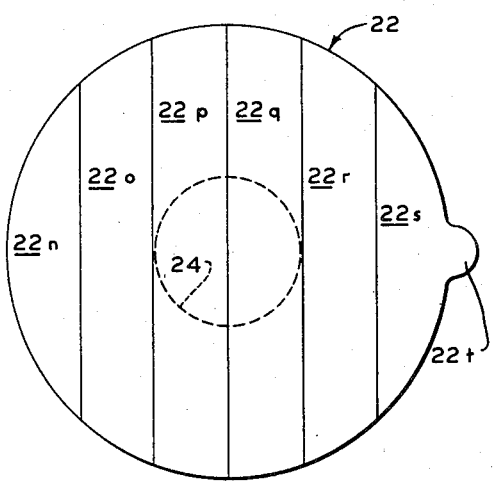
Fig. 6 is a diagrammatic exaggerated plan view of still another modification of the radiation-sensitive layer.

Referring now to Figs. 5 and 6, there are shown modifications of the photosensitive element 22 of Figs. 1 through 4. In Fig. 5 there is shown a photosensitive element 22 which contains a number of concentric rings of photosensitive material, these various rings preferably having different sensitivity with respect to the incident radiation. The liquid-carrying container 24 is shown, in dotted lines, in the center of the photosensitive layer 22 of Fig. 5, container 24 being surrounded by concentric photosensitive portions 22j, 22k, 22l and 22m. In one preferred form of this arrangement the sensitivity of the photosensitive portions increases as the radius increases. Thus, portion 22j is the least sensitive and portion 22m is the most sensitive. This embodiment of the invention is particularly advantageous when the conditions of processing of the product are such that nonuniform release of the liquid is apt to be obtained. For example, if a small arc of the container mouth is ruptured during the processing, the processing liquid is spread radially from the ruptured arc across each of the photosensitive portions so that there will be a processing of at least a portion of each of the circular photosensitive portions.

In Fig. 6 there is shown another type of photosensitive layer assembly wherein the various portions 22n, 22o, 22p, 22q, 22r and 22s indicate photosensitive portions of different sensitivity. This modification of the invention is particularly advantageous in those cases where mass production of the film units is to be achieved. In this case the various strips 22n, 22o, 22p, 22q, 22r and 22s may be cut from large rolls of the respective types of photosensitive emulsion and may be fed through automatic laminating machines, discs of the type shown in Fig. 6 being subsequently cut from the laminated composite structure thus obtained. With this form, a tab 22t is provided on one of the photosensitive portions for predeterminedly aligning this portion with tabs 32 and 34.

Figure 7:
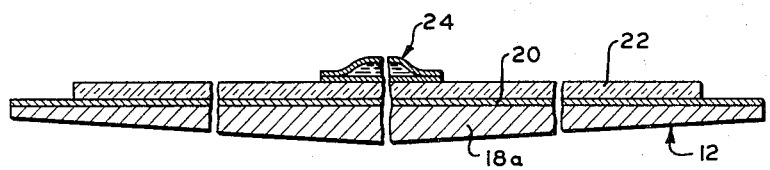
Fig. 7 is a diagrammatic sectional view of another modification of one of the liquid-confining layers.

Referring now to Fig. 7, there is shown a modification of the liquid-confining layer 12 which may be equally applied to the liquid-confining layer 10 of the embodiment of Figs. 1 through 4. In this modified form of the liquid-confining layer 12 the latter comprises the inner impermeable stratum 20 carrying the photosensitive layer 22 which is preferably of the concentric type shown in Fig. 5. The outer metal foil stratum 18a is shown as comprising a conical section which is thickest at the center and decreases in thickness towards the edges of the superposed photosensitive layer 22. With this form of the invention the central portions of the metal stratum 18a are highly absorptive to the incident radiation while the absorption decreases as a function of the radial distance from the center of the resultant product. The stratum 18a could, of course, also be thinnest at one edge and increase in thickness towards the other edge. While the stratum 18a has been shown in the form of a uniform wedge, it should be apparent that a step-wedge construction would be equally usable and would, in some cases, be preferable where exact graduations in intensity of incident radiation are to be detected.

Figure 8:
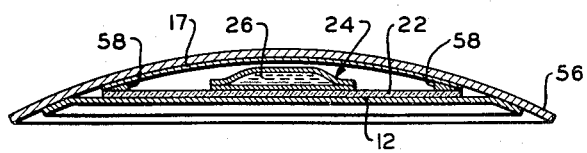
Fig. 8 is a diagrammatic exaggerated sectional view of still another modification of the invention.
Figure 9:
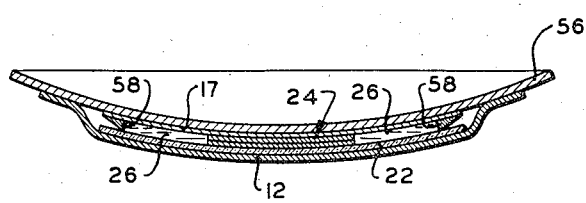
Fig. 9 is a view similar to Fig. 8 showing another position of the elements thereof.

In Figs. 8 and 9 there is shown still another modification of the invention which is particularly adaptable for processes wherein a relatively uniform layer of the spread liquid is desired in contact with the surface of the photosensitive layer 22, this being particularly desirable where the visible record of the extent of exposure of the photosensitive layer is obtained by a transfer process in accordance with the teaching in my aforementioned United States Patent No. 2,543,181. In this form of the invention one of the liquid-confining layers (liquid-confining layer 10 in the embodiment illustrated) is replaced by a "snapping" disc 56, for example of a springy, elastic material such as spring steel, Phosphor bronze, beryllium copper, phenolic resin such as "Bakelite" or styrene, which disc is normally bowed in one direction and which can be snapped so that it bows in the opposite direction. The "snapping" disc 56 may be formed, as shown, of a single springy, resilient material, or it may be a bimetallic sheet of the type employed in thermostatic controls, which snaps from one equilibrium position to another equilibrium position at a predetermined temperature. A disc of this type could be constructed to snap at a temperature just below or at body temperature and would be particularly useful in environments where temperatures in excess of 90° F. are rarely, if at all, encountered.

A print-receiving stratum 17 is preferably secured to the inner surface of disc 56. The liquid-confining layer 12 is preferably resilient although this is not essential if its dimensions are accurately formed with respect to the dimensions of the disc 56 before and after snapping. Otherwise, the liquid-confining layer 12, the print-receiving layer 17, the photosensitive layer 22, the container 24 and the processing liquid 26 may be made of materials specified as being preferable in the preceeding embodiments. In a preferred form of the invention, a plurality of spacers 58 are positioned circumferentially with respect to the photosensitive layer 22 from the facing surface of the disc 56 after the disc has been snapped. In this modification of the invention the exposure of the photosensitive layer 22 is preferably accomplished through the liquid-confining layer 12. This layer may be suitably modified to give differential absorption for the incident radiation, where such is desirable, as mentioned in the discussion of the preceeding modifications. After the exposure of the photosensitive layer 22, the edges of the disc 56 are supported by the user's fingers while his thumb is brought to bear at the center of the disc, thus first flattening the disc 56 from the concave shape shown in Fig. 8 and then snapping the disc to the convex shape shown in Fig. 9. As a result of this snapping of the disc 56, a pressure is applied to the container 24 which forces the liquid 26 from the container and distributes this liquid in a uniform radial pattern across the adjacent area of the photosensitive layer 22. Since the spacers 58 maintain the circumference of the photosensitive layer 22 spaced from the disc 56 by an amount substantially equal to the spacing of the central portion of the layer 22 from the disc 56, a substantially uniform layer of the liquid 26 will be spread across the whole surface of the photosensitive layer 22.

Figure 10:
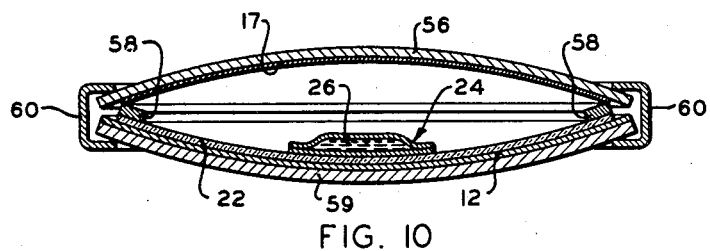
Fig. 10 is a diagrammatic exaggerated sectional view of still another modification of the invention.

Referring now to Fig. 10, there is shown another modification of the invention similar to that of Fig. 8 wherein a rigid curved disc 59 is provided as a backing for the liquid-confining layer 12. The inner surface of disc 59 is preferably of a radius larger than the radius of the facing surface of "snapping" disc 56 when it is convexly curved by an amount substantially equal to the composite thickness of spacer 58 and the portion of photosensitive layer 22 and liquid-confining layer 12 underlying spacer 58. The two discs 56 and 59 are connected together at the edges by a light-tight sealing member 60 which holds the two discs in the unsnapped and snapped position, this sealing member 60 having sufficient resilience to permit the snapping. Disc 59 may be formed of relatively rigid plastic such as polystyrene, while the other elements are preferably formed of materials previously enumerated as being preferable in the embodiment of Fig. 8.

In the use of the device of Fig. 10, exposure is preferably made through the backing disc 59 and the liquid-confining layer 12. The disc 56 is then snapped from its concave position to its convex position. As a result of this snapping, the container is ruptured and the liquid forced therefrom. The spacers 58 and the rigid backing disc 59 cooperate with disc 56 to give a very even spread of liquid across the surface of photosensitive layer 22. This is particularly true due to the fact that the two discs in the snapped position are, in effect, two concentric spherical surfaces having a predetermined radial spacing from each other.

Figure 11:
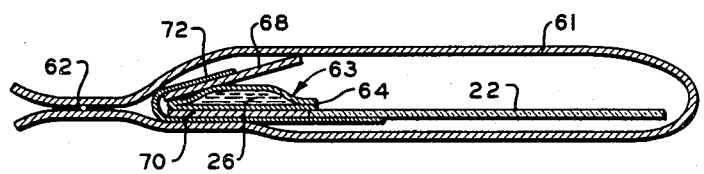
Fig. 11 is a diagrammatic exaggerated sectional view of still another modification of the invention.

Referring now to Fig. 11, there is shown still another modification of the invention wherein the liquid-carrying container is positioned at one end of the photosensitive layer and is so arranged that the confined liquid therein may be released by biting that end of the film unit including the container. In this form of the invention the photosensitive layer 22 is included within an envelope 61 which is preferably both impermeable to liquid and opaque to actinic light. This envelope may comprise a single sheet folded upon itself and sealed, as at 62, at its edges. The liquid-carrying container, indicated at 63, includes a liquid-releasing mouth 64 positioned adjacent one edge of the photosensitive layer 22. This container is positioned between a pair of rigid plates 68 and 70, the plates being preferably hingedly secured to each other and secured to the photosensitive layer 22 by means of a strip of sealing tape 72. In the use of this unit, exposure of the photosensitive layer 22 thereof may be accomplished by radiation passing through one of the walls of the covering 61. The left hand end of the film unit is then placed in the user's mouth. By biting upon the two rigid plates 68 and 70 a high hydraulic pressure is created in the contained liquid 26 which ruptures the seal at the container mouth 64 to force the liquid 26 out of the container 63. The liquid 26 may then be spread across the surface of layer 22 by pulling between the user's teeth or fingers or by spreading with the palm of the hand against a flat surface.

Figure 12:
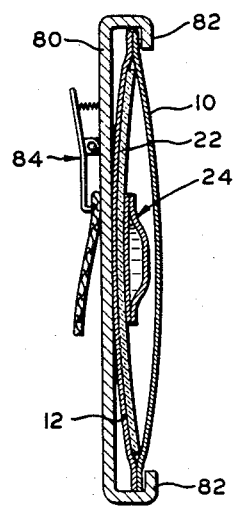
Fig. 12 is a diagrammatic exaggerated sectional view of a holder for the various products of the invention.

In Fig. 12 there is shown schematically a holder for the various film units described above. This holder comprises a supporting member 80 having overturned lips 82 under which a film unit may be positioned. The film unit is shown schematically as comprising a first liquid-containing layer 10, a second liquid-containing layer 12, photosensitive layer 22 and the container 24. For attaching the holder to the wearer there is indicated a catch 84 which is arranged to clip onto a wearer's shirt or coat pocket, for example.

In the various film units described above, in some cases it is quite desirable to provide inner strata of the liquid-confining layers, which are in contact with the spread liquid, which have a relatively high absorption for the solvent in the processing liquid. This is helpful in a number of the image-forming reactions and also has the advantages of hastening the drying of the spread layer of liquid so as to hasten the formation of a dimensionally stable film by means of the film-forming colloid preferably included as a constituent of the processing liquid. This absorption may be readily obtained, for example, by the use of a paper as the stratum 17 and by the use of gelatin for the photosensitive emulsion.

The combination of the liquid-confining layers, the photosensitive element, the rupturable container and the processing fluid may be any one of the specific combinations shown and illustrated in my aforementioned United States Patent No. 2,543,181, issued February 27, 1951, and any one of the processes described in said application may be employed for the purpose of giving a visible indication of the degree of the photoexposure of the photosensitive element.

In some instances, as for example when the so-called "color blind" emulsions are used in the photosensitive element, it is possible to form the light barriers from sheet materials that are transparent to that portion of the visible spectrum to which the photosensitive element is not sensitive. In such case it becomes unnecessary, after the photosensitive element has been procesesd, to separate the light-opaque barriers in order to see the extent of development of the photosensitive element. In general, it is preferable that the light-opaque strata be substantialy opaque to the near visible as well as the visible radiation, i. e., to radiation which has a wavelength longer than 2000 angstroms.

It may also be desirable, in some instances, to provide barriers which filter out not only the visible and near visible radiation but also certain nuclear radiation as, for example, beta rays, slow neutrons or radiation of very low energy.

It is also to be understood that certain features of the invention, such for example as the provision of a resilient wall capable of being snapped to release and spread the liquid of the unit, may be utilized in photographic units serving purposes other than detection of dangerous radiation. In the latter case, it may be possible to employ in said units photosensitive layers which need not be photosensitive to gamma and other radiation of short wavelength. Where the unit serves to detect dangerous radiation, it is preferable that the photosensitive layer be a silver halide emulsion or an emulsion of some other crystalline material which, upon photoexposure, has a developable latent image formed therein, such for example as a heavy metal salt which develops to the metal of said salt to give a visible image.

In one example of a suitable combination of materials for forming transfer prints which indicate the extent of exposure of a radiation-sensitive silver halide emulsion to radiation actinic thereto, the print-receiving layer may be of baryta paper with the baryta-coated surface facing the photosensitive emulsion and the liquid in the rupturable container may comprise an aqueous solution of a silver halide developer, a silver halide solvent, an alkali and preferably a film-forming colloid such as a sodium carboxymethyl cellulose.

The terms "image," "latent image" and "transfer print" as used herein are understood to include within their scope the visible or latent records of a uniform exposure of the radiation-sensitive element to actinic radiation so that the visible image or print that is had is of a uniform density throughout its exposed area.

Since certain changes may be made in the above products without departing from the scope of the invention herein involved, it is intended that all matter contained in the above description, or shown in the accompanying drawings, shall be interpreted as illustrative and not in a limiting sense.

What is claimed is:

1. A radiation-indicating device of generally disk-like shape for providing a visible indication of a given type of radiation to which said device has been subjected, said device comprising a liquid-confining front wall substantially opaque to visible light and having a given transmittance for said radiation, a liquid-confining rear wall having a given opacity with respect to said radiation, means joining said walls to one another throughout adjacent peripheral regions thereof so as to form an envelope providing a cavity of given form and dimensions between said walls, a radiation-sensitive layer formed on an inner surface of one of said walls, said layer being sensitive to at least said given type of radiation, and a rupturable liquid-carrying container mounted at a central location between said walls and holding a liquid for processing said radiation-sensitive layer, said container having a contour which, on a reduced scale, is generally similar to that of said device and being attached to at least one of said walls and having a separably-sealed liquid release aperture extending substantially around its periphery and disposed in a direction generally parallel with said radiation-sensitive layer so that when compressive force is applied to opposed outer surfaces of said device which are aligned with said container, said liquid is released through said release aperture and is caused to come into contact with said radiation-sensitive layer and to permeate and process said layer.

2. A device according to claim 1 wherein one of said walls comprises material differentially transmissive of said radiation in various given regions of said wall.

3. A device according to claim 1 wherein said radiation-sensitive layer comprises regions differentially sensitive to said radiation.

4. A device according to claim 1 wherein the radiation-sensitive layer is comprised by the rear wall and, in turn, comprises a silver halide emulsion, wherein the processing liquid comprises an aqueous solution of a silver halide developer, a silver halide solvent, an alkali and preferably a film-forming colloid and wherein the rear wall comprises an image-receiving layer for having an image formed thereupon by a diffusion transfer reversal process.

5. A device according to claim 1 wherein at least one of said front and rear walls is composed of a concave elastic material adapted to be bowed to each of two positions, and wherein a compressive force for releasing the contained liquid is applied by said walls to the liquid-carrying container when said wall of elastic material is bowed to a given one of said positions.

6. A device according to claim 5 wherein the rear wall comprises said elastic material and an image-receiving stratum, and the front wall comprises an outer layer comprising a metallic stratum and a surface sensitive to at least said given radiation.

7. A device according to claim 1 wherein the front wall comprises given areas differentially transmissive of and differentially opaque with respect to said radiation which are selectively optically aligned with those given areas of said radiation-sensitive layer which are differentially sensitive to said radiation.

8. A device according to claim 1 wherein the front wall comprises a differentially radiation-transmissive outer layer comprising a metallic stratum, a liquid-impermeable stratum and an image-receiving surface, and wherein the rear wall comprises a surface sensitive to at least said given radiation.

9. A radiation detection device, said device, comprising a pair of overlying liquid-confining layers which are releasably secured together along marginal edges thereof to provide a sealed unit, a stratum sensitive to radiation of a wavelength within the visible spectrum and to shorter wavelength radiation including X-rays and gamma rays, and a rupturable container holding a processing liquid, said radiation-sensitive stratum comprising a material capable of recording the extent of the exposure thereof to said radiation in a record capable of being rendered visible by said liquid upon the processing of said stratum, and said stratum and said container being mounted in overlying relation to each other within said unit and between said layers, said container being smaller than the radiation-sensitive stratum and being positioned with respect thereto so as to lie between the marginal edges of said stratum whereby portions of said stratum extend beyond and entirely around the periphery of said container, said container having a releasably secured together discharge mouth extending around the periphery thereof, said discharge mouth being openable upon subjecting the container to sufficient pressure, applied from the exterior of said unit and directed substantially uniformly over opposite sides of the container, to effect the rupture of the container and the discharge of its liquid content outwardly from the periphery thereof for contact with said portions of said radiation-sensitive stratum which are located outwardly of and around said container, said unit containing, between the outer surfaces of said liquid-confining layers, reagents in sufficient quantity to so process the radiation-sensitive stratum as to produce a visible record of the extent of the exposure to actinic radiation of said radiation-sensitive stratum, said reagents being rendered operative upon the release of the liquid from the container.

10. A radiation detection device as defined in claim 9 wherein one of said liquid-confining layers provides deformable means for mechanically applying a substantially uniform pressure to said container to effect the rupture thereof.

11. A radiation detection device as defined in claim 9 wherein one of said liquid-confining layers comprises a springy elastic material and is normally concavely curved with respect to the contents of said unit, the last-named layer being capable of being snapped to a position in which it is convexly curved with respect to the contents of said unit, the movement of said last-named layer into its second position causing pressure to be exerted over the container to effect the rupture thereof and the release and discharge of its liquid content.

12. In a photosensitive product of the character including superposed liquid-confining layers, a photosensitive material characterized by being sensitive to light within the visible spectrum as well as to nuclear radiation, and all the materials necessary to process said photosensive material upon exposure thereof, in combination, a stratum of photosensitive silver halide located between said liquid-confining layers and carried by one of said layers, a rupturable container located between said layers and carried by one of said layers, said container and said photosensitive stratum being located in overlying relation to each other, a processing liquid carried within said container and effective upon discharge therefrom for developing latent image silver halide, said photosensitive stratum having an area considerably larger than the area occupied by said container and said stratum and container being so positioned with respect to each other that the periphery of the container lies within the marginal edges of said photosensitive stratum and is surrounded by portions of said stratum, said container having a releasably secured together discharge mouth which extends around the periphery of the container, said discharge mouth being released by compressing the container by the application to the opposite sides of said container of sufficient pressure to effect the rupture thereof and the discharge of the container contents outwardly from said periphery for contact with said portions of said photosensitive stratum located in surrounding relation to the container.

13. A photosensitive product of the character defined in claim 12 wherein the second of said liquid-confining layers carries a print-receiving stratum in facing relation to said photosensitive stratum and said product includes a silver halide solvent.

14. A photosensitive product as defined in claim 12 wherein said photosensitive stratum comprises a plurality of individual portions of silver halide possessing different film speeds.

15. In a device of the character described, a pair of overlying liquid-confining layers which are releasably secured together along marginal edges thereof to provide a sealed unit, said liquid-confining layers being substantially opaque to light within the visible portion of the spectrum and capable of transmitting nuclear radiation, at least a photosensitive stratum of silver halide and a rupturable container holding a processing liquid mounted in overlying relation within said unit and between said layers, said container being smaller than said photosensitive stratum and being so positioned with respect thereto as to be located generally centrally of said stratum whereby said container is surrounded by portions of said stratum, said container having a releasably secured together discharge mouth extending around the periphery thereof, said discharge mouth being opened upon subjecting the container to sufficient pressure, applied from the exterior of said unit and directed substantially uniformly onto opposite sides of the container, to effect the rupture of the container and the discharge of its liquid content outwardly from the periphery thereof for contact with said portions of said photosensitive stratum which surround said container, and said unit also including at least a silver halide developer soluble in said liquid.

16. A device as defined in claim 15 wherein a print-receiving stratum is provided within said unit and is so positioned that said container is located between said photosensitive stratum and said print-receiving stratum, and wherein said unit includes a silver halide solvent.

17. A device as defined in claim 15 wherein said photosensitive stratum comprises a plurality of individual portions of silver halide possessing different film speeds.

18. A device as defined in claim 15 wherein one of said liquid-confining layers comprises a resilient sheet material and provides deformable means for mechanically applying a substantially uniform pressure to said container to effect the rupture thereof.

References Cited in the file of this patent

UNITED STATES PATENTS

| | | |
|---|---|---|
| 1,902,277 | Chase | Mar. 21, 1933 |
| 2,209,914 | Gerber et al. | July 30, 1940 |
| 2,258,593 | Black | Oct. 14, 1941 |
| 2,498,741 | Sperry | Feb. 28, 1950 |
| 2,543,181 | Land | Feb. 27, 1951 |
| 2,557,434 | Hoverder | June 19, 1951 |
| 2,616,051 | Daniels | Oct. 28, 1952 |
| 2,687,478 | Land | Aug. 24, 1954 |

FOREIGN PATENTS

| | | |
|---|---|---|
| 567,011 | Germany | Dec. 24, 1932 |
| 456,471 | Great Britain | Nov. 10, 1936 |